Patented June 13, 1944

2,351,074

UNITED STATES PATENT OFFICE 2,351,074

LOW MELTING POLYAMIDES

Leroy Frank Salisbury, Wilmington, Del., assignor to E. I. du Pont de Nemours & Company, Wilmington, Del., a corporation of Delaware No Drawing. Application May 9, 1941, Serial No. 392,761

9 Claims. (Cl. 260—78)

This invention relates to polymeric materials and more particularly to synthetic linear polyamides.

This case is a continuation-in-part of my application Serial No. 388,185 filed April 11, 1941.

The polyamides used in the practice of this invention are of the general type described in U. S. Patents 2,071,250, 2,071,253 and 2,130,948. These polyamides, generally speaking, comprise the reaction product of a polyamide-forming composition in which the molecules are bifunctional and contain two amide-forming groups, each of which is complementary to an amide-forming group in other molecules in said composition.

The polyamides as described above or as otherwise identified hereinafter can be obtained, for example, by self-polymerization of monoaminomonocarboxylic acids, or by reacting a diamine with a dibasic carboxylic acid in substantially equimolecular amounts, it being understood that reference herein to the amino acids, diamines, and dibasic carboxylic acids is intended to include the equivalent amide-forming derivatives of the amino acids, the dibasic carboxylic acids, and the diamines. The linear polyamides include also polymers obtained by admixture of other linear polymer-forming reactants, as for instance glycol-dibasic acid mixtures in the case of polyester-amides, with the mentioned polyamide-forming reactants. Both the simple polyamides and the modified polyamides contain recurring amide groups as an integral part of the main chain of atoms in the polymer. The average number of carbon atoms separating the amide groups in the polymer chain is at least two. In the case of the modified polyamides the ratio of amide groups to other carbon-non-carbon groups, as for instance the ester group in the polyester-amides, should as a rule be at least 1:20 in order that the polymer exhibit the desired polyamide properties. On hydrolysis with hydrochloric acid the amino acid polymers yield the amino acid hydrochloride, and the diamine-dibasic acid polymers yield the diamine hydrochloride and the dibasic carboxylic acid.

The invention is applicable to low molecular weight polyamides as well as to the higher molecular weight or fiber-forming polyamides.

The polyamides with which this invention is more particularly concerned are the low melting polyamides of the above mentioned type. Examples of the low melting polyamides, that is those melting below 150° C., are polyamides in which the amide nitrogen atoms bear substituents, or the polyamides which contain a hetero atom such as oxygen, sulfur or tertiary nitrogen in the main polymer chain. Various polyamides of this kind are described in U. S. Patents 2,130,523 and 2,158,064.

It has been proposed previously to mix these low melting polyamides in order to blend their properties. The preparation of these mixtures has been easy and convenient because homogeneous blends can often be formed without the use of elevated temperatures, that is without temperatures above 180° C. These mixtures, however, possess a serious defect in that although they may be physically homogeneous, the polymeric constituents are not chemically united and consequently can be separated by purely physical means. This characteristic constitutes an important obstacle to the use of such mixtures in applications where exposure to liquids having a different solvent effect on the two polymers is concerned. It is not satisfactory to substitute for a mixture of two low melting preformed polyamides an interpolyamide (of the same empirical composition) formed by conjoint polymerization of the monomeric polyamide-forming reactants from which the two preformed polyamides were derived. While interpolymers are not separable into polymeric components by physical means, they are deficient in that they have lower melting points than the corresponding mixtures of preformed polyamides. In fact, interpolymers differ so markedly in properties that they are frequently unsuitable for the uses to which polyamide mixtures are applied.

This invention has as an object new and useful polyamide compositions. A further object is a method for preparing from a plurality of polyamides an improved polyamide composition from which the individual preformed polyamides are essentially inseparable by physical means.

The above objects are accomplished by heating, until the polymeric components are no longer completely separable by physical means, a substantially dry melt comprising a plurality of preformed low melting polyamides at a temperature between at least that at which amide interchange occurs at an appreciable rate and the temperature at which the ingredients undergo pyrolytic degradation. The lower temperature is about 180° C. and the upper temperature is in the neighborhood of 320° C. in the absence of oxygen although the temperature at which pyrolysis becomes appreciable varies somewhat according to the polyamide employed. If oxygen is not excluded, the exclusion of oxygen being preferred but not essential, the polyamides are degraded oxidatively at a considerably lower temperature than that indicated. The preferred temperature, because of more rapid amide interchange without tendency to degradation, is from about 220° C. to 300° C. The time of heating required is in general not less than about ten minutes and is preferably from one to four hours.

As the heating is continued, progressive changes occur in the physical properties of the material. For example, if the initial mixture is a solid at room temperature the melting point is gradually lowered in the direction of the melting point of the interpolyamide which would be formed by mixing the same polyamide-forming ingredients in the same proportion before instead of after polymerization. The amount of melting point lowering is proportional to the difference between the melting point of the initial blend and the melting point of the corresponding interpolymer, and consequently depends upon the particular composition employed. The reaction product also becomes softer, more pliable, and more soluble, and in these properties the reaction product approaches the properties of the corresponding interpolymer. If the initial mechanical mixture is a liquid at room temperature, these changes of properties occur but can be recognized only by tests made at reduced temperatures. In either case, at a relatively early stage of the heating scredule the polymeric components of the reaction product become substantially inseparable by physical means. For example, if only one component is soluble in a selective solvent per se, it will be found impossible to remove selectively more than an insignificant proportion of that component by extraction with this solvent.

The melt blend should be substantially dry since the presence of water in more than small amounts has a hydrolytic effect which results in lowering the molecular weight of the product. This does not mean the original preformed polyamides must be absolutely dry. Polyamides conditioned under ordinary atmospheric conditions can be used satisfactorily.

The product obtained by the above procedure which can be referred to as a semi-interpolymer has a melting point intermediate between that of the simple physical mixture and the corresponding interpolyamide. The present products are somewhat softer, more pliable, more soluble and lower melting than the polyamide mixtures from which they are prepared, but are characterized by higher melting points, greater stiffness, and less solubility than the corresponding interpolyamides.

The following examples, in which the parts are by weight, are further illustrative of the practice of this invention.

Example I

A mixture of 14.9 parts of poly-12-aminostearamide (intrinsic viscosity 0.86; softening point 112° C.) and 14.4 parts of polydecamethylene diphenylolpropanediacetamide (intrinsic viscosity 0.40; softening point 80° C.) are melted together in a nitrogen atmosphere at the temperature of boiling dibenzofurane (285° C.). The softening point of a specimen withdrawn from the initial melt, which is not homogeneous, is 110° C. As heating is continued for 1 to 2 hours with occasional stirring, a single liquid phase is formed. At the end of 3 hours' heating semi-interpolymer formation is well advanced and the resulting product has a softening point of 88° C.

Example II

A mixture of 17.0 parts of N-methyl polytriglycol adipamide (water-soluble liquid) and 16.1 parts of the water-insoluble interpolymer (softening point 146° C.) derived from the polymerization of hexamethylenediammonium adipate (45%), heptamethylenediammonium sebacate (45%), and hexamethylenediammonium pimelate (10%) are melted together in a nitrogen atmosphere at 285° C. The ingredients are completely miscible at the beginning of the heating. A specimen of the material withdrawn after 0.5 hour of heating has a softening point of 103° C. After 3 additional hours of heating at 285° C. the product is a tough, rubbery solid having a softening point of 80° C. A pellicle of this material (2.67 parts) is extracted with water for 18 hours at 70° C. and subsequently rinsed and dried. Its weight then amounts to 2.45 parts, corresponding to a weight loss of 8.2% of the whole and 13% of the soluble component. This fact demonstrates that nearly all of the soluble component is chemically combined by semi-interpolymer formation during the heating schedule employed.

The semi-interpolymers obtained in accordance with the following examples were formed by heating for at least 0.5 hour at 275° C. the mixtures of low melting polyamides indicated. The products in all instances are not completely separable by physical means.

Example III

Twenty parts of N-methylpolyhexamethylene adipamide, which is a liquid at normal temperatures, are heated for about 30 minutes under the conditions mentioned above with 80 parts of an interpolyamide melting at 150° C. and consisting of the interpolymerization product of hexamethylenediammonium adipate, hexamethylenediammonium sebacate, and epsilon-caprolactam in the ratio of 35:25:40. The semi-interpolymer obtained softened at 130° C.

When the above example is repeated with the interpolyamide differing in that its reacting ingredients are in the proportion of 40:20:40 and in that its melting point is 148° C., the resulting semi-interpolymer has a softening point of 130° C.

Example IV

Twenty-eight and three-tenths parts of N-methylpolyhexamethylene adipamide and 71.7 parts of an interpolyamide melting at 130° C. and consisting of the interpolymerization product of hexamethylene diammonium adipate and 12-aminostearic acid in the proportion of 40:60 was heated for about 30 minutes in accordance with the procedure given in Example III. The resulting product softened at 115° C.

Examples of other low melting superpolyamides useful in the practice of this invention are 17-aminoheptadecanoic acid polymer; polytriglycol N,N' - piperazinediacetamide; polytriglycol N-methyliminodiacetamide; polytriglycol 5-hydroxy - 1,9 - nonanedicarbonamide; N-amylpolyhexamethylene adipamide; polyhexamethylene diphenylolpropanediacetamide; interpolymerization product of 12-aminostearic acid (40) and caprolactam (60); polymerization product of a mixture of 9- and 10-aminostearic acids; interpolymerization product of hexamethylenediammonium adipate (25), hexamethylenediammonium azelate (45), and epsilon-aminocapronitrile (30); interpolymerization product of hexamethylenediammonium adipate (10), heptamethylenediammonium pimelate (45), and hexamethylenediammonium sebacate (45); and interpolymerization product of hexamethylene diammonium adipate (20), hexamethylenediammonium azelate (45), hexamethylenediammonium sebacate (15), and epsilon-aminocaprolactam (20).

Various amide-forming derivatives can be used instead of amino acids, diamines, and dibasic carboxylic acids in making the above polyamides. Amide-forming derivatives of the amino acids include the esters, anhydrides, amides, lactams, acid halides, N-formyl derivatives, carbamates, and nitriles in the presence of water. Amide-forming derivatives of the dibasic carboxylic acids comprise the mono- and di-esters, the anhydrides, the mono- and di-amides, acid halides, and the following compounds in the presence of water: Nitriles, cyanocarboxylic acids, cyanoamides, and cyclic imides. Amide-forming derivatives of the diamines include the carbamates, N-formyl derivatives and the N,N'-diformyl derivatives.

Any desired proportions of the polymeric ingredients may be employed. Semi-interpolymers can also be formed according to this invention from mixtures containing 3 or more different low melting polyamides or interpolyamides.

The low melting polyamides offer special advantages in the preparation of semi-interpolymers. Since they melt well below amide-forming temperatures, it is possible to secure a uniform mixture of the molten polyamides before reaching reaction temperatures and consequently a more uniform product is obtained on heating to amide-forming temperatures. The products also have certain advantages over the semi-interpolymers obtained from higher melting polyamides. In particular they can, by reason of their low melting points, be added to other materials, e. g. fabrics, without danger of thermal decomposition. They are also especially useful as plasticizers for the higher melting polyamides.

The time of heating required to secure a given degree of reaction between the polymers used in this invention varies with the temperature. For example, the extent of chemical union of the polymeric ingredients which occurs in 4 hours at 202° C. may require only 0.5 hour at 285° C. The proportion of the ingredients which undergo amide interchange and thus become chemically united (forming semi-interpolymers) increases as the heating is continued. After a relatively short time, depending upon the temperature employed, substantially all of the ingredients have interacted, and the resulting composition is substantially inseparable by physical means into the original polymeric constituents. The properties of the product at this stage are still quite different from the properties of the corresponding interpolymer formed by polymerizing together the monomeric polyamide-forming ingredients from which the original polymeric constituents of the semi-interpolymer were derived.

In general, the semi-interpolymer formed by heating just until substantial physical inseparability is achieved possesses a higher melting point, greater stiffness, lower solubility, and greater hardness than the corresponding interpolymer. As the heating is continued, the semi-interpolymer approaches the corresponding true interpolymer in properties, that is, it becomes lower melting, more pliable, more soluble, and softer. The rate at which the properties of the semi-interpolymer approach the properties of the interpolymer diminishes as the similarity between the two increases so that the semi-interpolymer and interpolymer become indistinguishable only after very greatly prolonged heating schedules. In the preferred embodiment of the invention the heating is continued from at least one hour to not more than 4 hours. Since an excessive lowering of melting point is frequently undesirable, the heating should be stopped short of the point at which the properties resemble those of the interpolyamide.

While agitation of the ingredients is not an essential part of this process, in the interests of efficiency it is preferred to agitate the melt thoroughly during heating. Since the polyamides are ordinarily too viscous to mix spontaneously by diffusion, it is useful to mingle them mechanically, as by stirring or pumping, to obtain a microscopically homogeneous product.

The reaction can be carried out at atmospheric, subatmospheric, or superatmospheric pressure. The polyamide products may be used as such or in conjunction with other substances such as solvents, plasticizers, dyes, cellulosic derivatives, resins, oils, etc.

The products of this invention are useful as ingredients in coating, impregnating, adhesive, and molding compositions. The utility of the products depends upon their possession of the desirable feature of interpolymer, i. e., the inseparability of the polymeric components, while having in addition significantly greater stiffness and hardness and higher melting points than interpolymers. It is thus possible by means of this invention to combine the properties of two polymers with relatively minor losses in the desired characteristics. For example, a low melting polyamide which is solid at ordinary temperatures may be modified according to this invention by heating it with a small proportion of a liquid polyamide or of a water-soluble polyamide which imparts to the product greater flexibility, resilience, or solubility. The beneficial properties of the modifier are thus present in the product to a large extent without sacrificing all of the characteristics of the main component.

As many apparently widely different embodiments of this invention may be made without departing from the spirit and scope thereof, it is to be understood that I do not limit myself to the specific embodiments thereof except as defined in the appended claims.

I claim:

1. A process for obtaining an improved polyamide composition from a mixture of a plurality of different polyamides each of which melts below 150° C., said process comprising heating at a temperature of at least about 180° C. and below the temperature at which substantial pyrolytic degradation occurs a substantially dry melt of said mixture, maintaining the reaction mixture substantially dry throughout the reaction, and continuing the reaction at said temperature until the polyamides from which said mixture was formed are physically inseparable in substantial amount, and discontinuing the heating at a stage where the melting point of the product obtained is higher than that of an interpolymer obtained by interpolymerization of the reactants from which the polyamides in said mixture are formed, said polyamides being the reaction product of a linear polymer-forming composition selected from the class consisting of (a) monoaminomonocarboxylic acids, and (b) mixtures of diamine with dibasic carboxylic acid.

2. A process for obtaining an improved polyamide composition from a mixture of a plurality of different polyamides each of which melts below 150° C., said process comprising heating under substantially dry conditions for one to four hours at a temperature above 180° C. but below the temperature at which substantial pyrolytic degradation occurs a substantially dry melt of said mixture, said polyamides being the reaction product of a linear polymer-forming composition selected from the class consisting of (a) monoaminomonocarboxylic acids, and (b) mixtures of diamine with dibasic carboxylic acid.

3. A process for obtaining an improved polyamide composition from a mixture of a plurality of different polyamides each of which melts below 150° C., said process comprising heating under substantially dry conditions for at least ten minutes at a temperature above 180° C. but below the temperature at which substantial pyrolytic degradation occurs a substantially dry melt of said mixture, said polyamides being the reaction product of a linear polymer-forming composition selected from the class consisting of (a) monoaminomonocarboxylic acids, and (b) mixtures of diamine with dibasic carboxylic acid.

4. The process set forth in claim 1 in which said heating is at a temperature of from about 180° C. to about 320° C.

5. The process set forth in claim 1 in which said heating is at a temperature of from about 220° C. to about 300° C.

6. A polymer comprising the product obtained by heating below the degradation temperature and above 180° C. a molten anhydrous mixture of different polyamides melting below 150° C., said polymer having a melting point higher than that of the interpolyamide obtained by interpolymerization of the reactants from which said different polyamides are formed, said polyamides being the reaction product of a linear polymer-forming composition selected from the class consisting of (a) monoaminomonocarboxylic acids, and (b) mixtures of diamine with dibasic carboxylic acid.

7. The polymer set forth in claim 6 in which one of said polyamides is poly-12-aminostearamide.

8. The polymer set forth in claim 6 in which one of said polyamides is N-methylpolyhexamethylene adipamide.

9. The polymer set forth in claim 6 in which one of said polyamides is an interpolyamide melting below 150° C. and consisting of the interpolymerization product of hexamethylenediammonium adipate, hexamethylenediammonium sebacate and epsiloncaprolactam.

LEROY FRANK SALISBURY.